(12) United States Patent
Knowles et al.

(10) Patent No.: US 8,234,986 B2
(45) Date of Patent: Aug. 7, 2012

(54) METHOD AND APPARATUS FOR TURBULENT COMBUSTION OF FLY ASH

(75) Inventors: Jimmy C. Knowles, Chapin, SC (US); Richard F. Storm, Albermarle, NC (US)

(73) Assignee: The Sefa Group, Inc., Lexington, SC (US)

( * ) Notice: Subject to any disclaimer, the term of this patent is extended or adjusted under 35 U.S.C. 154(b) by 0 days.

(21) Appl. No.: 11/917,886

(22) PCT Filed: Jun. 16, 2006

(86) PCT No.: PCT/US2006/023380
§ 371 (c)(1),
(2), (4) Date: Dec. 17, 2007

(87) PCT Pub. No.: WO2006/138501
PCT Pub. Date: Dec. 28, 2006

(65) Prior Publication Data
US 2008/0282947 A1 Nov. 20, 2008

(51) Int. Cl.
*F23J 3/00* (2006.01)
*D01F 13/00* (2006.01)
*B29B 17/00* (2006.01)
(52) U.S. Cl. ..... 110/344; 110/213; 110/244; 110/165 A; 264/37.29
(58) Field of Classification Search ............... 110/244, 110/213, 344, 165 A; 264/37.29
See application file for complete search history.

(56) References Cited

U.S. PATENT DOCUMENTS

| 3,869,995 | A | * | 3/1975 | Straitz, III | 110/213 |
| 4,683,840 | A | * | 8/1987 | Morin | 122/4 D |
| 4,733,621 | A | * | 3/1988 | Kostamo et al. | 110/347 |
| 4,890,562 | A | * | 1/1990 | Gitman | 110/236 |
| 4,969,930 | A | * | 11/1990 | Arpalahti | 48/197 R |
| 5,160,539 | A | | 11/1992 | Cochran | |
| 5,262,962 | A | * | 11/1993 | Kindig | 700/271 |
| 5,390,611 | A | * | 2/1995 | John | 110/165 A |
| 5,399,194 | A | | 3/1995 | Cochran et al. | |
| 5,408,942 | A | | 4/1995 | Young | |
| 5,566,625 | A | | 10/1996 | Young | |
| 5,727,482 | A | | 3/1998 | Young | |

(Continued)

FOREIGN PATENT DOCUMENTS
JP 57174614 A 10/1982

OTHER PUBLICATIONS

ACAA (American Coal Ash Association) website: http://www.acaa-usa.org/PDF/2003_CCP_Suryey(10-1-04).pdf; downloaded Jul. 31, 2006.

(Continued)

*Primary Examiner* — Yogendra Gupta
*Assistant Examiner* — Jeremiah Smith
(74) *Attorney, Agent, or Firm* — Charles L. Warner; Edward J. Hejlek; Bryan Cave LLP

(57) ABSTRACT

An apparatus for processing fly ash comprising a heated refractory-lined vessel having a series of spaced angled rows of swirl-inducing nozzles which cause cyclonic and/or turbulent air flow of the fly ash when introduced in the vessel, thus increasing the residence time of airborne particles. Also disclosed is a method of fly ash beneficiation using the apparatus.

13 Claims, 2 Drawing Sheets

U.S. PATENT DOCUMENTS

| | | | | |
|---|---|---|---|---|
| 5,935,885 A * | 8/1999 | Hnat et al. | ............ | 501/1 |
| 6,105,517 A | 8/2000 | Swithenbank | | |
| 6,457,425 B1 | 10/2002 | Crafton et al. | | |
| 6,521,037 B1 | 2/2003 | Hurt et al. | | |
| 6,783,585 B2 * | 8/2004 | Zacarias et al. | ............ | 106/405 |
| 6,886,476 B2 * | 5/2005 | Katsui | ............ | 110/255 |
| 7,047,894 B2 | 5/2006 | Crafton et al. | | |
| 2004/0033184 A1 * | 2/2004 | Greer | ............ | 423/215.5 |
| 2004/0123786 A1 * | 7/2004 | Crafton et al. | ............ | 110/346 |

OTHER PUBLICATIONS

ACAA—Federal Highway Administration; Fly Ash Facts for Highway Engineers; 4th Edition; FHWA-IF-03-019; pp. 1, 61; Jun. 2003.

Ellison et al.; Technical Overview of Recent and Ongoing Developments; http://www.netl.doe.gov/publications/proceedings/99/99flyash/ellison.pdf; downloaded Jul. 31, 2006.

Hurt et al.; Fundamental Study of Low NOx Combustion Fly Ash Utilization; Apr. 1999; Brown University.

Kosmatka et al.; Design and Control of Concrete Mixtures; 14th Edition; pp. 58-59; Portland Cement Association 2002.

Search Report for International Patent Application No. PCT/US2006/023380; Jan. 22, 2007.

Canadian Intellectual Property Office, Julien Daigle, Canadian Search Report, Oct. 19, 2009, Canada.

Japanese Patent Office, Incinerator, Translation, Patent Office Gazette, S-57-174614, Oct. 27, 1982.

* cited by examiner

METHOD AND APPARATUS FOR TURBULENT COMBUSTION OF FLY ASH

PRIORITY CLAIM

This application is a U.S. National Phase of International Patent Application No. PCT/US2006/023380, filed Jun. 16, 2006, which claims the benefit of U.S. patent application Ser. No. 11/424,364, filed Jun. 15, 2006, entitled METHOD AND APPARATUS FOR TURBULENT COMBUSTION OF FLY ASH, which status is pending, which claims priority to U.S. Provisional Patent Application No. 60/691,729, filed Jun. 17, 2005, entitled METHOD AND APPARATUS FOR TURBULENT COMBUSTION OF FLY ASH, the disclosures of which are incorporated herein by reference in their entirety.

FIELD

The present disclosure relates to methods for processing fine particulate matter, such as coal fly ash, to improve its characteristics, such as by reducing the residual carbon, and removing contaminants, such as mercury, ammonia, and the like. The present disclosure also relates to apparatus for processing fly ash as well as a fly ash product.

BACKGROUND

Coal fly ash is produced by coal-fired electric and steam generating plants and other industrial facilities. Typically, coal is pulverized and blown with air into the combustion chamber of a boiler where the coal immediately ignites, generating heat and producing a molten mineral residue. Boiler tubes extract heat from the boiler, cooling the flue gas and causing the molten mineral residue to harden and form ash. Coarse ash particles, referred to as bottom ash or slag, fall to the bottom of the combustion chamber, while the lighter fine ash particles, termed fly ash, remain suspended in the flue gas. Prior to exhausting the flue gas, fly ash is removed by particulate emission control devices, such as electrostatic precipitators or filter fabric baghouses.

The American Coal Ash Association reports that 70,150,000 tons of fly ash was produced in 2003 and that 27,136,524 were beneficially utilized, while the remainder was disposed in lagoons and landfills. The most prevalent utilization application for fly ash (12,265,169 tons) was in concrete as pozzolan. Pozzolans are siliceous or siliceous and aluminous materials, which in a finely divided form and in the presence of water, react with calcium hydroxide at ordinary temperatures to produce cementitious compounds.

A substantial portion of fly ash particles are reactive glass, which will combine with alkali hydrates, especially calcium hydroxide, that are formed as cement hydrates in plastic concrete. This chemical reaction is referred to as a pozzolanic reaction and the result of this reaction is a stable cementious bond, similar to the bond that results through the hydration products of cement, particularly, calcium-silica-hydrate (sometimes referred to as tobermorite gel). The cementitious bonds produced through the pozzolanic reaction of fly ash effect an increase in the strength and durability of the concrete. The strength-producing characteristics of fly ash allow for a lower amount of cement than would otherwise be needed. The value of fly ash as pozzolan is generally related to the cost of the portion of cement that is replaced by the fly ash.

Due to strategies implemented by electric utilities to meet lower emission limits, whether self-imposed or instituted by government regulations, such as the Clean Air Act Amendments of 1990, coal-burning operations have changed and will continue to change over the next decades. Generally speaking, these changes in coal-burning operations are intended to reduce the emissions of particulate matter or polluting gases, such as sulfur and nitrogen oxides. Individually these pollution control methods are designed to limit emissions of, among other things, (1) dust and/or very fine particulate matter, which are associated with increased rates of hospital admissions, respiratory disease and mortality, especially for mortality due to respiratory and cardiovascular disease for infants and the elderly, (2) fumes of sulfur oxides (SOx), which are directly related to the concentrations and quantities of acid rain, (3) fumes of nitrogen oxides (NOx), which are precursors for ground level ozone, and (4) mercury and other heavy metals, especially those that are considered to be persistent bioaccumulative toxins.

It is estimated that by the year 2010, these new pollution control strategies will result in 6,400 fewer premature deaths, and also create a savings of nearly $40 billion dollars in health care costs. These numbers increase to 12,000 fewer deaths and $93 billion dollars in health care savings by the year 2020.

Unfortunately, some of the unintended consequences of these pollution control methods have negatively impacted the utilization of the coal fly ash, especially as pozzolan in concrete. According to the ACAA less than 17.5% of the fly ash produced in 2003 was used as pozzolan. However, in many parts of the U.S., the demand for fly ash as pozzolan is significantly higher than the local supply of pozzolan-grade fly ash. A major reason for this shortage of "quality" fly ash is caused by changes in the characteristics of fly ash produced in the U.S. due to changes made to coal-burning operations and to the increased use of post-combustion pollution control techniques implemented by electric utilities to meet lower emission limits.

According to the U.S. Department of Transportation's Federal Highway Administration, changes in boiler operations and/or air emissions control systems at power plants will continue to alter the quality of fly ash produced. Factors that impact ash quality in this way include: a reduction in the pozzolanic reactivity; the presence in the fly ash of excessive unburned carbon; and, chemical residuals from post-combustion emission control.

It would be desirable to beneficially alter the characteristics of coal fly ash, especially the fly ashes that have been negatively affected by the aforementioned pollution control methods. Generically, such processes are called beneficiation processes; specifically, it would be desirable to have a thermal beneficiation process that is especially designed to alter these particular characteristics.

There are three major issues which affect the value and utility of fly ash used as pozzolan in concrete: the pozzolanic, strength-producing characteristics; the air-entraining characteristics; and, the presence of foreign residual chemicals.

Pozzolanic reactivity is typically measured by the compressive strength ratio between plain portland cement and pozzolan-containing concretes. U.S. ASTM C 618 as presently written specifies minimum "strength activity index" performance properties, which compares the compressive strength of a control concrete specimen made of plain portland cement to a pozzolan-enhanced cement concrete specimen. Unfortunately, since complete strength activity index testing takes at least one month, there is a substantial lag time before definitive quantification of pozzolanic reactivity can be determined. Fortunately, there is a very good correlation between the specific surface area of the fly ash glass and pozzolanic reactivity with both cement and lime. Therefore, quick calculation of the specific surface area of the fly ash glass can be used to infer pozzolanic reactivity.

There are several other tests and techniques to infer pozzolanic reactivity. Unfortunately, the correlations between these single-variable test results and pozzolanic reactivity are typically very poor. For example, since pozzolanic reactivity in concrete is mostly related to the reaction between the glass in fly ash and alkalis present in the cement paste matrix, chemical requirements for the fly ash are often used to infer the quantity the reactive glass and, consequently, to classify grades of fly ash and/or predict pozzolanic strength activity. Specifically, pozzolanic reactivity is mostly related to the reaction between the reactive silica glass and calcium hydroxide producing calcium silicate hydrate. The alumina in the pozzolan will also react in the cement paste matrix, producing calcium aluminate hydrate, ettringite, gehlenite, and calcium monosulphoaluminate hydrate. ASTM and some other standards associations have also included the iron oxide content as a major requirement.

However, there is a poor correlation between the sum of these oxides (i.e., silica, alumina, and iron) and compressive strength. This may be partly due to the presence of varying amounts of nonreactive, crystallized phases of silica and alumina (quartz and mullite) and/or inconsistent, and sometimes counterproductive, contribution of iron oxide to strength development. Consequently, using the sum of these oxides is not considered to be a good technique to infer the strength activity of a fly ash.

Therefore, in summary, pozzolanic reactivity can best be quantified through a "strength activity index," but determination of specific surface area for the fly ash glass will approximate changes in pozzolanic reactivity. Increasing the glass to crystalline ratio of fly ash will increase the pozzolanic reactivity and, consequently, the value of the fly ash.

Due to the lower combustion temperatures necessary to reduce the formation of thermal NOx, commercial operation of low-NOx burners produce coal ash that has not been exposed to the high-temperature operating conditions employed before low-NOx combustion techniques were implemented. The operating temperatures employed for low-NOx combustion may be below the melting point of individual constituents of the mineral matter contained in the coal being burned, especially for the higher ash fusion bituminous coals. Consequently, the amount of mineral mater that has become molten and then air-cooled, thereby forming reactive glass, may be reduced significantly due to low-NOx combustion of coal.

There is very little published literature about the reduced pozzolanic reactivity of fly ashes produced through low-NOx burning of pulverized coal. However, according to U.S. Department of Energy publications (see, IBWA1netl.doe.IBWA2/publications/proceedings/99/99flyash/ellison.pdf, where IBWA1="http://www.", and IBWA2=".gov", the Internet address being presented in this manner so as not to be in the form of browser-executable code), application of low-NOx combustion " . . . is seen to hinder high-value fly ash utilization in two ways: (1) much publicized increase in unburned carbon content of fly ash that inhibits commercial use in air-entrained concrete; and, (2) little mentioned, or understood, impairment of ash pozzolanic properties, caused by the greatly reduced fuel firing temperature . . . "

Decreasing the glass to crystalline ratio of fly ash will decrease the pozzolanic reactivity and consequently the value of fly ash. The pozzolanic reaction of fly ash glass is also known to increase the long-term durability of concrete. When fly ash is used as pozzolan in concrete, the density of the concrete paste matrix may increase significantly and, therefore, the durability of the concrete may be significantly greater than with ordinary portland cement alone. Increasing the glass to crystalline ratio of fly ash will increase the pozzolanic reactivity, making the concrete more impervious and, therefore, more durable.

A second major issue affecting the utilization and value of fly ash—the air-entraining characteristics of the fly ash—is also related to the impact of fly ash on concrete durability. Particularly, one aspect of concrete durability, namely, freeze-thaw durability, may be negatively impacted by the presence of fly ash, especially by the presence of unburned carbon that remains in fly ash following the coal-burning operation.

There are many factors that can affect the durability of concrete to cycles of freezing and thawing; however, the single greatest impact on freeze thaw durability derives from the presence and uniform distribution of air voids in the hardened cement paste matrix with optimum spacing and size.

When hardened concrete begins to freeze, residual water inside concrete will also freeze; when water freezes its volume increases 9%. The expanding ice forces water into the unfrozen regions of the cement binder. This movement of water creates large hydraulic pressures and generates tensile stress. Although concrete has excellent strength in compression, its tensile strength is less than 10% of the compressive strength. When the tensile stress exceeds the tensile strength of the concrete, cracking and deterioration occurs. A network of air voids with the proper spacing and size distribution in the hardened cement paste matrix allows the water to expand and migrate deeper into the concrete, reducing the hydraulic pressure and tensile stress in the concrete.

Air is naturally entrapped in the cement paste of plastic concrete through the folding and shearing action of the mixing process. However, the entrapped air voids are large and not stable in concrete without the use of surface active agents, commonly called surfactants. Surfactants can be used in the production of concrete to reduce the surface tension of water. Consequently, large air voids will divide into smaller, more stable air voids. Air entraining agents (AEAs) are commonly used as surfactants in the production of concrete designed to increase freeze-thaw durability.

Residual unburned carbon in fly ash can have a high adsorptive capacity for AEAs. More specifically, there are certain active sites on the carbon surface, which are typically nonpolar, that preferentially adsorb AEAs from the aqueous phase. The rate of AEA adsorption will vary according to the type, amount, and/or level of activated carbon surface area, requiring a varying increase in AEA dosage to maintain the desired entrained air void system or else resulting in an inconsistent level of entrained air in the hardened concrete, which will ultimately affect the strength and/or durability of the concrete by degrading the air void system. There is also an increased risk of over-dosing the AEA and creating an elevated entrained air content, which would negatively impact the strength of the hardened concrete.

The use of fly ash as pozzolan is typically controlled by specifications that effectually limit the amount of unburned carbon that can remain in fly ash used as pozzolan. Most specifications prescribe a maximum limit for the Loss On Ignition (LOI) of fly ash used as pozzolan in concrete. LOI is a percent-by-weight measure of the residual combustible material, primarily carbon, in the fly ash. The strength-producing characteristics of a fly ash are relatively unaffected by LOI levels up to and above 12%; therefore, the low maximum limits prescribed by most of the controlling specifications for fly ash as pozzolan in the U.S. are not necessary to assure the strength-producing characteristics. Instead, the intent of these low maximum LOI limits is to assure adequate air-entraining characteristics for pozzolan-grade fly ash used to produce air-entrained concrete. The concrete industry also references specific LOI values for fly ash to predict and/or monitor the air-entraining characteristics of the various fly ashes available in the marketplace and there is a general perception that lower LOI levels equate to higher quality.

There are several processes in commercial use that aim to significantly reduce the LOI of moderate to high LOI fly ashes—to a level below 3% by weight, specifically triboelectric separation and carbon combustion. It should be noted that carbon makes up most of the measured LOI (to within about 10%); however, as previously discussed, it is the adsorptive capacity of the fly ash, especially the active carbon sites, for air entraining agents and not the LOI per se, that impacts the marketability of the fly ash. At this time, there is a growing realization that lower LOI fly ashes do not assure superior, or even adequate, air-entraining characteristics for many fly ashes.

Therefore, regardless of the specific reduction of LOI through combustion, it would be desirable to beneficially alter the air-entraining characteristics of the processed fly ash by reducing the overall adsorptive capacity of the fly ash.

A third major issue affecting the utilization and marketability of fly ash also derives from operational changes in the coal-burning process, specifically the presence of residual chemicals and/or particulate matter deposited in or adsorbed on the coal fly ash during the coal-burning operation and/or subsequent flue gas treatment processes, especially those processes intended to reduce air pollution. These changes in coal-burning operations are intended to reduce the emissions of particulate matter; polluting gases, such as sulfur and nitrogen oxides; and heavy metals, such as mercury, or other toxic emissions, especially those considered to be persistent bioaccumulative toxins.

There are several different techniques for the reduction of each of the above pollutants and coal-burning operations often utilize a combination of some or all of these pollution control techniques in order to meet the targeted emission levels. One example of these pollution control techniques, namely, flue gas conditioning, is used to enhance precipitator performance. This technique deliberately deposits foreign chemicals, particularly ammonia, sulfur, and other proprietary chemicals, on the coal fly ash. This technique actually "conditions" the fly ash by coating the particles with these chemicals, changing the surface conductivity and, therefore, the resistivity of the fly ash. These chemicals may also create a space-charge effect and improve the cohesiveness of the fly ash particles.

Injecting these chemicals in the hot flue gases will improve the efficiency of electrostatic precipitators and, therefore, the collection rates for the coal fly ash. However, the collected fly ash will have increased levels of ammonia, sulfur oxides, and/or other residual chemicals which are known to negatively impact the marketability of fly ash as pozzolan at high concentration levels.

Additional pollution control techniques include, but are not limited to, fuel switching and/or blending, the use of low-NOx burners, flue gas treatment to enhance the performance of NOx scrubbers, e.g., selective catalytic reduction (SCR), non-selective catalytic reduction, selective auto-catalytic reduction, etc., as well as the use of flue gas desulfurization (FGD) scrubbers, etc. All these techniques have specific effects on the fly ash which negatively impacts the marketability of fly ash as pozzolan.

For example, there are several dry FGD scrubbing techniques that are used in coal burning operations to decrease the emissions of sulfur oxides, such as lime spray drying, duct sorbent injection, furnace sorbent injection, and circulating fluidized bed combustion. The use of any of these techniques can result in a single, comingled by-product stream consisting of coal fly ash and spent lime sorbent. The general make-up of the residual particulate matter collected following these coal burning and dry FGD scrubbing operations, often generically referred to as "spray dryer material," are a heterogeneous combination of coal fly ash and a blend of calcium sulfate and calcium sulfite compounds.

The chemical composition of spray dryer material residues depends on the sorbent used for desulfurization and the proportion of fly ash collected with the FGD residues. The fly ash in dry FGD materials has similar particle size, particle density, and morphology to those of conventional fly ashes, but FGD materials have lower bulk densities. The difference in bulk density is due to variations in the chemical and mineralogical characteristics of the reacted and unreacted sorbent. Dry FGD materials contain higher concentrations of calcium and sulfur and lower concentrations of silicon, aluminum, and iron than fly ash.

Typically, dry FGD materials usually will not conform to the controlling specifications for pozzolans (e.g., ASTM C-618), due to the varying chemistry and glass content, the presence of high levels of calcium sulfate, and the generally heterogeneous nature of dry FGD materials. Therefore, they cannot be reliably used as pozzolan, especially for pozzolan in concrete structures.

In addition to the altered by-product particulate matter generated through the use of these various clean air strategies, air emissions from some of these pollution control techniques have in and of themselves resulted in other air pollutants. For example, at many power plants, when flue gas undergoes selective catalytic reduction of NOx, high levels of $SO_3$ are emitted from the stack. The $SO_3$ is visible as a "blue plume" and quickly condenses into a mist of sulfuric acid, damaging the health of humans, animals, and plant life and destroying real property.

Therefore, coal-burning operations employing combinations of certain air pollution control techniques are now being forced to mitigate the unintended consequences of their actions by further altering their operations with additional flue gas treatments to limit emissions of blue plume ($SO_3$) aerosols or other condensable particulate matter yet to be determined and/or publicly reported in the literature.

In summary, coal burning operations have changed and will continue to change in order to comply with federally mandated and/or self-imposed limits on air emissions. These changes in coal-burning operations include, but are not limited to, the use of low-NOx burners; fuel blending/switching, flue gas conditioning with ammonia or sulfur to enhance precipitator performance; flue gas treatment to enhance the performance of NOx scrubbers; and/or FGD scrubbers to reduce the emissions of particulate matter or polluting gases, such as sulfur and nitrogen oxides.

Examples of residual chemicals and foreign particulate matter that may be deposited in or adsorbed on coal fly ash include, but are not limited to: (1) ammonia and/or $SO_{3(solid)}$ from flue gas conditioning; (2) ammonia from NOx reduction scrubbing and/or slip; (3) the chemical residuals from injecting hydrated lime, magnesium hydroxide, sodium bicarbonate carbonate, ammonia, sulfur, sodium bisulfate, magnacite, magnesium silicate, magnesium oxide, etc. for mitigating blue plume, i.e., $SO_{3(gas)}$; and, (4) mercury-laden sorbents such as activated carbon from mercury scrubbing.

The presence of any of these foreign residual chemicals and/or particulate matter will negatively impact the utilization of fly ash in general and will especially negatively affect the value of fly ash marketed as pozzolan in concrete.

The deterioration of fly ash quality referenced above negatively impacts the value, marketability and, therefore, the utilization of fly ash in the U.S. Specifically, a reduction in the pozzolanic reactivity reduces the strength-producing characteristics; excessive unburned carbon is associated with poor air-entraining characteristics; and chemical residues in the fly ash can negatively impact the marketability of fly ash as pozzolan in these and other ways, creating additional technical and aesthetic concerns.

It would be desirable to economically increase the value and utility of fly ash in the marketplace by improving those characteristics of fly ashes that have been identified by the concrete industry as being deleterious to the production of quality concrete; specifically, it would be desirable to improve pozzolanic reactivity or strength producing characteristics, air-entraining characteristics, and contamination from chemicals used for flue gas treatment.

SUMMARY

The present disclosure describes several exemplary embodiments of the present invention.

One aspect of the present disclosure provides a method for processing low-Btu value particulate matter, comprising a) introducing into a reactor chamber a feed of particulate matter comprised of combustible and incombustible matter; b) heating said particulate matter; c) introducing ambient air into said combustion chamber at a high velocity through a plurality of nozzles, said nozzles arranged to induce laminar swirling and/or turbulent air flow patterns in said reactor chamber; and, d) separating processed particulate matter from said air flow.

Another aspect of the present disclosure provides an apparatus for beneficiation of fly ash or other material, comprising a) a refractory-lined vessel; b) at least one heat source for heating; c) a plurality of swirl-inducing nozzles; d) a plurality of turbulence-inducing nozzles for creating turbulent air flow within said vessel; e) means for introducing said fly ash into said vessel; f) a heat exchanger for cooling said fly ash material; and, g) means for removing separated material from said vessel.

A feature of the present disclosure is to provide a method and apparatus to thermally treat and, thereby, beneficially alter certain characteristics of low-Btu value fine particulate matter, especially coal fly ash, increasing the value of the processed fine particulate material, especially as pozzolan, over the value of by-product fly ash which has not been processed or otherwise beneficiated. This process is designed to expose fly ash to high temperatures in order to effect certain physical and/or chemical changes which will increase the pozzolanic reactivity and/or the amount of reactive glass surface area, improve the air-entraining characteristics by decreasing the level of activated carbon, and reduce the presence of chemical residuals deposited in and/or on the fly ash during flue gas treatment.

Increasing pozzolanic reactivity derives mainly from increasing the amount and/or surface area of reactive glass in the fly ash. At the present time, there is very little published literature on the reduced pozzolanic reactivity of fly ashes produced through low-NOx burning of pulverized coal. However, due to the lower combustion temperatures necessary to reduce the formation of thermal NOx, lower amounts of the mineral matter contained in the coal are being converted to amorphous glass than before the deployment of low-NOx combustion techniques. Fly ash processed through the present invention shows an increase in the specific surface area of the glassy mineral matter, which corresponds with increased pozzolanic reactivity after processing with the present invention.

Specifically, the fly ash processed through the present invention shows an increase in the specific surface area of the glassy mineral matter, creating additional glass and increasing the fineness, through exposure to the unique circumstances caused by the present invention.

The processing temperature in the present invention is above the fusion temperature of the mineral matter, causing the crystalline structure of the mineral matter to break down and become molten.

The particulate matter is reduced in size as carbon and other combustible matter contained in the char particles oxidizes and/or volatizes, significantly increasing the surface area of the particulate matter.

The coarsest particulate matter undergoes a disproportionate size reduction, because the coarsest particles are deliberately subjected to tangentially oriented, high velocity gas streams designed to create centrifugal forces that increase particulate matter residence time in the reaction zone and segregate coarser and/or denser particulate matter, which require the longest retention time to effect significant chemical and/or physical change, so that the coarser particles are closer to the refractory-lined walls and the coarsest particles are subjected to solid-to-solid contact with the refractory-lined walls. The thermal mass provides an elevated heat source to expedite thermal reactions to combust the coarsest carbon char particles, which typically contain many smaller inorganic inclusions, thereby freeing up that mineral matter to be finely divided and to become molten.

Additional heat energy is imparted directly to any remaining inorganic mineral inclusions, thereby converting additional mineral matter to a molten state, through the exothermic heat release of additional carbon combustion accomplished by exposure to downwardly oriented high velocity gas streams designed to create shearing forces that create turbulence, increasing kinetic rate of molecular transport for carbon redox. The finely divided molten particulate mineral matter remains in a finely divided state, being separated by hot flue gases and being suspended and transported by said hot gases while in a finely divided molten state until laminar pneumatic transport patterns are re-established, thereby inhibiting agglomeration and, especially, fused or sintered product material.

The molten mineral matter is quenched to below ash fusion temperature through the evaporative cooling effect of spray water injected into the hot gas stream in order to solidify the mineral matter as glass, completing the vitrifying process with a tempering effect which is designed to increase the glass-to-crystalline ratio and the reactivity of the amorphous mineral matter to a greater extent than would normally be accomplished through the typical annealing effect of coal-burning or existing fly ash carbon combustion processes, which are more slowly cooled by the radiant heat transfer necessary for maximum heat recovery.

Other processes are known that utilize fly ash to manufacture products with high glass content. One method describes a formulation that uses fine coal ash as a constituent for soda-lime glass, wherein the fly ash becomes a part of the soda-lime glass melt. In one method the fly ash is added and mixed with other constituents to form the molten glass. At the elevated temperatures required for soda-lime vitrification, any crystalline mineral matter in the fly ash would become molten and become a part of the melt. However, the fly ash becomes a part of a new glass product and does not remain in the finely divided state required to be used as pozzolan.

Another reported method uses fly ash from incinerated solid waste materials to produce an inert vitrified ash product and coal fly ash to produce ceramic products and glazing, respectively. In these and other similar methods, fly ashes or other fine particulate matter is used to produce vitrified products. It would be desirable to have a method to process finely divided fly ash or other particulate matter so as to both increase the glass to crystalline ratio of the material and to remain as a finely divided material suitable for use as pozzolan.

Many processes have been described that thermally treat fly ash and which also attempt to keep the fly ash as a finely divided material suitable for use as pozzolan. However, these methods are intended to combust residual carbon in fly ash or volatize ammonia on fly ash and do not operate at the high temperatures necessary to melt mineral matter. One method claims lower operating temperatures to stay below ash fusion temperatures and, thereby avoid sintering fly ash in fluid bed carbon burn out operations.

The invention disclosed in the present disclosure can operate at the high temperatures required to melt the crystalline structure of the mineral matter and yet avoids sintering or other thermal agglomeration because the process maintains high temperatures in the reactor while the hot flue gases re-establish non-turbulent, laminar flow patterns which ensure that individual molten particles remain separated while suspended and transported in the hot flue gases until after the quenching spray water reduces the temperature below the ash fusion temperatures.

Other prior art methods teach a thermal treatment in a fluid bed of a mixture of particulate matter which includes fly ash and other alkali compounds. However, this thermal processing is specifically intended and controlled to reduce the glass content and increase the crystalline content of the resultant product. Conversely, the process of the present invention is specifically intended and controlled to increase the glass-to-crystalline ratio of the fine particulate matter and the present invention does not require processing in a fluid bed.

The thermal treatment processes a mixture of particulate matter which includes fly ash and other alkali compounds in a fluid bed. However, the thermal processing is specifically intended and controlled to reduce the glass content and increase the crystalline content of the resultant product. It would be desirable for a treatment to increase the glass to crystalline ratio of the fine particulate matter and the present invention does not accomplish processing in a fluid bed. It would be desirable to have a method for particle size reduction without the use of fine grinding or other mechanical devices.

A secondary, related feature of the present invention is to increase the fineness of particulate matter, especially fly ash, by decreasing the size of the carbon char particles. One existing method is a treatment of fly ash that includes fine grinding of fly ash with at least one other compound, thus assuring that the resultant product is finely divided and presumably suitable for use as pozzolan.

There are other processes which have been described that effect particle size reduction through fine grinding or other mechanical means. It would be desirable to have a method for particle size reduction without the use of fine grinding or other mechanical devices.

Typically, the coarsest particles in a fly ash are unburned coal char or coke. Being similar to coal, although essentially devolatized, these char particles contain smaller inclusions of inorganic mineral matter. It would be desirable to have a method which can be operated in such a way as to combust the residual carbon char in the fly ash. Individual burning char particles have been described as a shrinking carbon core; as the carbon surrounding the mineral matter volatizes, the size of the individual char particles is reduced significantly. Also, a desirable method should specifically process the coarsest fly ash char particles in a deliberate fashion to disproportionately expedite a shrinking carbon core for these particles, thereby freeing the smaller inorganic inclusions from the larger char particles, creating new, very fine particulate matter.

Another feature of the present disclosure, improving the air-entraining characteristics of the fly ash, derives through thermal oxidation to effect a combination of reduced carbon surface area and destruction and/or occlusion of active carbon sites.

The AEA adsorption efficacy of residual unburned carbon in fly ash is affected by the amount, type, and availability of activated sites. The invention of the present disclosure will treat fly ash through thermal oxidation and, thereby, may, depending on operating conditions: 1) reduce the amount of coal coke (i.e., lower LOI) through combustion, and/or 2) oxygenate active carbon sites (i.e., increase LOI) through oxygen deposition, and/or 3) occlude active carbon sites by decreasing the critical ash porosity and/or increasing the ash film thickness surrounding coal char particles.

It is not necessarily a goal of this invention to accomplish any of these treatments individually; rather, the fly ash would be treated to maximize the beneficial effect on the air-entraining characteristics of the fly ash. However, depending on the operating parameters of the invention of the present disclosure and the characteristics of the fly ash being processed, any of the above listed treatments could be individually accomplished. Some of the treatments described hereinabove have been attempted and, in some cases accomplished, either commercially or in the laboratory. However, there is no prior art teaching of one method or apparatus to accomplish the combination of all these effects in one treatment. Also, the apparatus of the present invention is unique and operates using a fast fluidized regime.

An apparatus or method which will treat fly ash and thereby modify the ash film boundary of coal char particles to increase the ash film thickness and/or density (and reduce the porosity), thereby increasing the coverage of the ash film boundary, occluding active carbon sites and/or impeding the adsorption of AEA has not been taught.

A number of technologies have been explored to try to effect carbon combustion in fly ash to reduce the carbon levels as low as possible. The primary problems that have faced most commercial methods in recent years generally have been the operational complexity of such systems and maintenance issues that have increased the processing costs per ton of fly ash processed, in some cases, to a point where it is not economically feasible to use such methods.

Another method describes a process in which the ash is conveyed in basket conveyors and/or on mesh belts through a carbon burn out system that includes a series of combustion chambers. A further method describes a process in which the finest carbon fraction of the residual carbon in fly ash is burned. Others have described processes whereby known ash feed or conveying systems transport ash using conveyors, screw mechanisms, rotary drums and other mechanical transport devices through one or more combustion chambers.

At the high temperatures typically required for ash processing, however, such mechanisms have often proved difficult to maintain and operate reliably. In addition, such mechanisms typically limit the exposure of the carbon particles to free oxygen by constraining or retaining the ash within baskets or on mesh belts such that combustion is occasioned by, in effect, diffusion through the ash, thereby retarding the effective throughput through the system. Consequently, fly ash carbon residence times within the furnace also must be on the order of upwards of 30 minutes to affect a good burn out of carbon. All of these factors generally resulting in a less effective and costlier process and have never been commercialized.

Crafton et al. (U.S. Pat. No. 6,521,037) describes a fluid bed combustion process designed to reduce the LOI to below 2%. Also, U.S. Pat. No. 5,160,539 and U.S. Pat. No. 5,399,194 issued to Cochran describe prolonged roasting in a fluid bed to reduce the LOI in a temperature range from 1300 to 1800° F. (700 to 982° C.) and 800 and 1300° F. (426 and 700° C.), respectively.

In early work, by Cochran, two types of "transport reactors" were tested with residence times on the order of 1 to 15 seconds. In these transport reactors all of the reactants travel together at more or less the same speed. In this early work, the large volume of air necessary to provide sufficient stoichiometric oxygen for carbon burnout was used to transport the reacting fly ash from inlet to discharge points.

However, no substantial carbon burnout was detected and Cochran discontinued development of a pneumatic transport solid gas reactor. Ultimately, in order to increase retention time at high temperature, Cochran developed the bubbling fluid bed reactor (U.S. Pat. Nos. 5,160,539 and 5,399,194). The present disclosure teaches an apparatus and method for thermal processing, including carbon combustion, using a pneumatic transport solid gas reactor.

In all the prior art cited above for thermal processing of fly ash, the specific design and clear intent of these inventions is to eliminate as much carbon as possible. This requires that the fly ash particles be supplied with sufficient temperature, oxygen and residence time, usually a prolonged period of time roasting in a heated chamber, to cause the carbon within the fly ash particles to ignite and burn, leaving clean ash particles.

U.S. Pat. No. 6,783,585 issued to Zacarias et al. teaches a thermal method which preferentially combusts only the finest fraction of the residual unburned carbon in fly ash but this process does not effectively treat active carbon sites or to combust or otherwise treat the coarse carbon particles. The invention of the present disclosure treats all the residual carbon in the fly ash and specifically processes the coarsest fly ash char particles in a deliberate fashion to accelerate a shrinking carbon core, thereby expediting the development of a thicker ash film boundary to encapsulate or occlude any remaining active carbon sites.

Another approach to beneficiating fly ash relates to chemically treating the residual unburned carbon in fly ash. These chemical treatments employ a range processes and oxidizing reagents from liquid peroxides and nitric acid to ozone gas. However, all generally intend to oxidize the residual unburned carbon in an attempt to de-activate the "activated" carbon in the fly ash, usually by depositing an oxygen molecule on the exposed surface of active sites on the residual carbon in fly ash, thereby satiating the propensity of the carbon to adsorb the AEA dosed in the concrete. This de-activation of the activated carbon is sometimes called "passivation." All these approaches to beneficiating fly ash occur at ambient temperatures.

The present invention does effect the same chemical and physical changes (i.e., oxidation and passivation) as these other treatments; however, the present disclosure employs an entirely different method, in particular, a high-temperature operating regime and uses ambient oxygen in atmospheric air as the reagent.

Another feature of the present disclosure, reducing the presence of foreign chemical residuals deposited on the fly ash during flue gas treatment, derives mainly from the chemical and/or physical changes, including changes in chemical speciation, disassociation, and/or decomposition, to these chemical residuals in the high temperature and oxygen-rich operating regime of the invention disclosed herein.

Furthermore, the apparatus includes the infrastructure to direct other materials, including gases, liquids, solids, or combinations thereof, which would act as additional reagents to facilitate the desired chemical and/or physical changes and the temperature in the reactor can be optimally maintained to expedite said reactions as desired.

For example, ammonia is used both for flue gas conditioning and flue gas treatment and, consequently, significant levels of ammonia may be deposited on the fly ash, reducing the volume, the value, and (potentially) the safety of fly ash utilized in concrete. Any ammonia deposited on fly ash processed with the present invention will undergo chemical decomposition, converting ammonia to nitrogen and water vapor.

Specific operating temperatures, air flows, and retention times for beneficiating fly ash and/or other particulate matter with the method of the present invention will vary according to the processing constraints required to effect the desired physical and/or chemical changes. These process constraints, such as the temperature/time requirements to effect combustion, oxidation, oxygenation, ash fusion, volatilization/condensation, changes in specification, etc., for the particulate matter itself, as well as the various contaminants targeted for processing, are individually known by those skilled in the art and, do not need to be disclosed in detail to describe the present disclosure.

For example, the chemical composition of spray dryer material residues depends on the sorbent used for desulfurization and the proportion of fly ash collected with the FGD residues. The fly ash in dry FGD materials has similar particle size, particle density, and morphology to those of conventional fly ashes, but FGD materials have lower bulk densities. The difference in bulk density is due to variations in the chemical and mineralogical characteristics of the reacted and unreacted sorbent. Dry FGD materials contain higher concentrations of calcium and sulfur and lower concentrations of silicon, aluminum, and iron than fly ash.

Processing such spray dryer material residues through the method of the present invention will have the effect of burning, and thereby volatizing, some of the combustibles present in the particulate matter. Therefore, the specific particulate matter which combusts at certain operating temperatures will have the effect of changing the overall chemistry of the resultant processed material, since a portion of the particulate matter that is combustible will volatize as flue gas, leaving as solid residue primarily the non-combustible mineral matter.

Also, the ash fusion temperature of such spray dryer material residues will be significantly lower than the ash fusion temperature of the coal that is burned due to the significant increase in alkalinity from the residual particulate matter deposited in the fly ash from the calcium-based sorbents. Consequently, processing such material through the invention as disclosed herein can dramatically increase the glass to crystalline ratio, increasing the pozzolanic reactivity such that the resultant material would meet the strength activity requirements of the controlling specifications.

However, the specific operating conditions required to effect the necessary chemical and physical changes needed to manufacture a pozzolan-grade material from dry FGD material will vary from site to site and disclosing those operating conditions would compromise obvious competitive advantages endemic to that knowledge.

BRIEF DESCRIPTION OF THE DRAWINGS

The present disclosure is illustrated in the drawings in which like reference characters designate the same or similar parts throughout the figures of which.

DETAILED DESCRIPTION

The present disclosure generally relates to the beneficial thermal processing of low-Btu value fine particulate matter, such as, but not limited to, fly ash, in order to remove specific targeted contaminants deposited in or on the particulate matter or otherwise augment the particulate matter through concentration or through reaction with additional reagents. For the purposes of the present disclosure fly ash will be discussed as a nonlimiting example of particulate matter which can be processed using the methods described herein. Other fine particulate matter, such as, but not limited to, spray dryer material (also known as FGD materials) or the like, may be used, possibly with modification of the apparatus or method parameters in ways known to those skilled in the art. More particularly, the present disclosure relates to a method, apparatus and the products derived from processing fly ash in a reactor designed to expose fly ash to the intimate presence of a sufficient gas reactant (especially oxygen), at the required temperature, and for the required time to effect certain physical and/or chemical changes that increase the value of the fly ash when used as pozzolan in concrete. Specifically, these changed characteristics will increase the pozzolanic reactivity and/or the amount of reactive glass surface area, improve the air-entraining characteristics by decreasing the level of activated carbon, and reduce the presence of chemical residuals deposited on the fly ash during flue gas conditioning and/or treatment.

Another feature of the present disclosure is to manufacture higher-value pozzolans from and/or co-process fly ash with dissimilar raw feed materials (e.g., other than coal fly ash), which have little or no Btu value and which can be processed at high temperatures to manufacture other products possessing pozzolanic properties or other known pozzolans, such as calcined clay, metakaolin, rice hull ash, etc. For example, baghouse fines from aggregate crushing operations may be chemically similar to fly ash and have a similar particle-size distribution, but, because the particulate matter is almost exclusively crystalline, the pozzolanic reactivity is almost non-existent. These baghouse fines could be processed using the present invention separately or co-processed with coal fly ash. When processed through the present invention, the baghouse fines would be transformed into a finely divided glass with significant pozzolanic reactivity.

Figure 1:
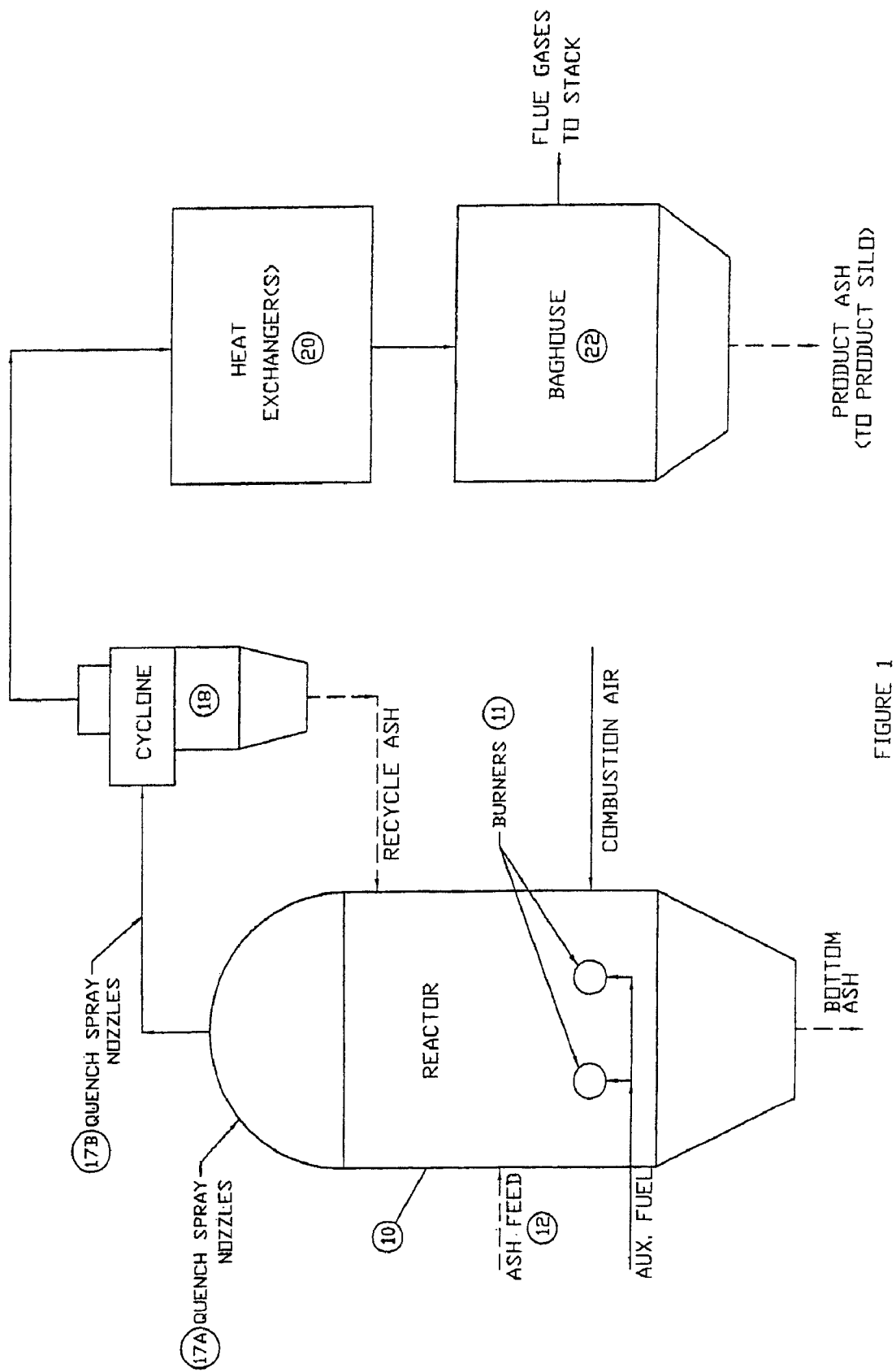
FIG. 1 is a schematic view of one exemplary embodiment of an apparatus of the present disclosure.
Figure 2:
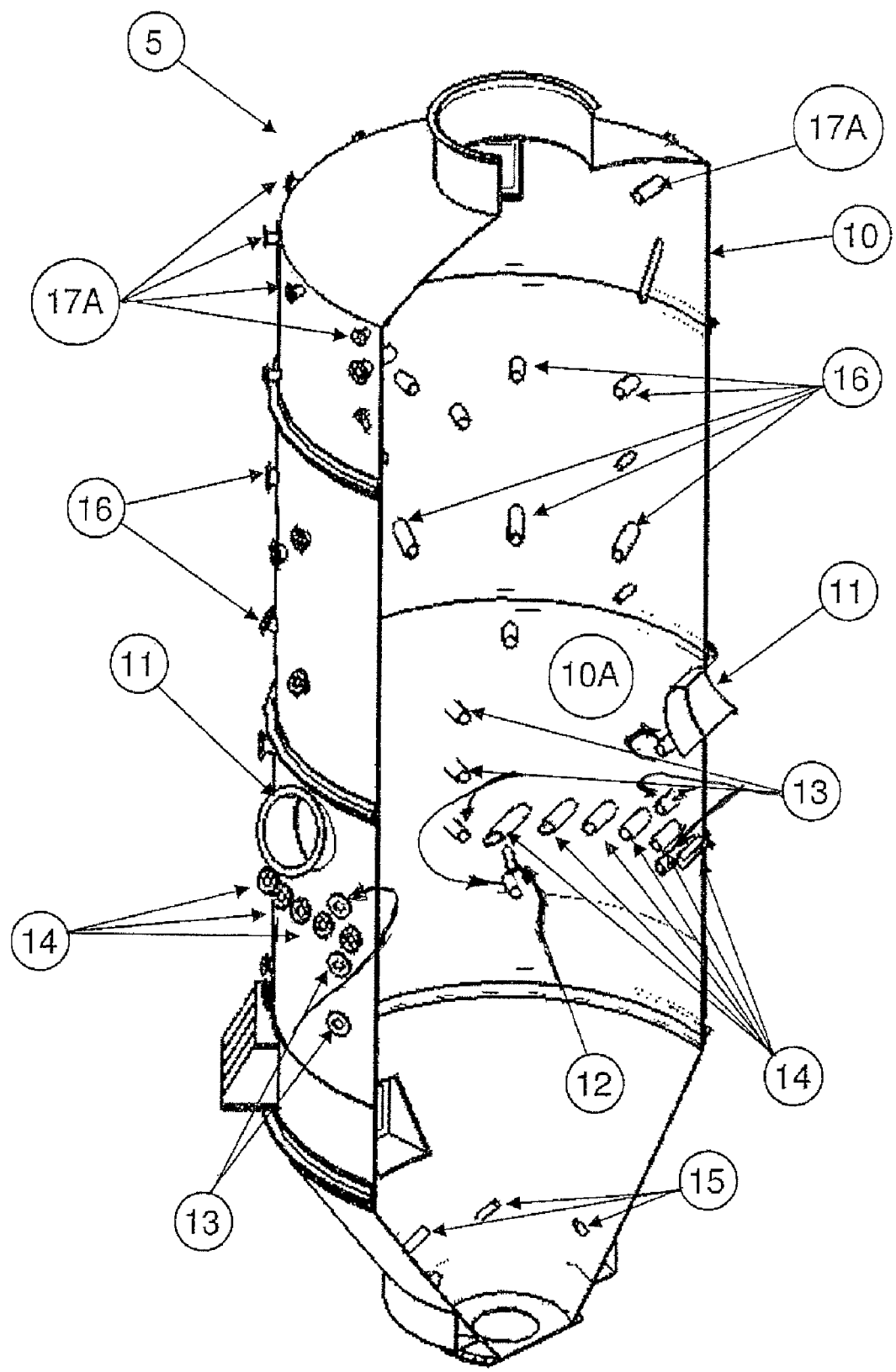
FIG. 2 is a cutaway perspective view of one exemplary embodiment of a reactor according to the present disclosure.

In one exemplary embodiment of the present invention, shown in FIGS. 1 and 2, an apparatus 5 comprises a refractory-lined reactor vessel 10, wherein the refractory is heated by burners 11 to a sufficiently high temperature to provide the required thermal mass to elicit the desired chemical and/or physical changes in the fly ash or other fine particulate matter.

The burners 11 are used for start-up; however, continuous isothermal processing can be maintained through the input of heat released by the exothermic reaction of burning residual carbon in the fly ash. Of course, if there is not enough fuel value in the fly ash for self-sustaining combustion and/or to maintain a heat balance at the desired target temperature, the burners 11 would be used to maintain the required temperature.

Raw feed fly ash, which may be preheated if desired, is conveyed into the reactor 10 through the fine particulate feed ports 12. Ambient air or other gas, which may also be preheated if desired, serves as the primary reagent and is conveyed at high velocity into the reactor 10 through a number of swirl-inducing nozzles 13 or manifolds with several heads which can arranged in a single row, multiple rows, staggered or in other configurations, and designed to induce both swirling and turbulent air flow patterns, which help facilitate mixing and generally expediting the desired thermal reactions.

For the purposes of the present disclosure, "turbulence" or "turbulent" is defined as a state of being highly agitated and turbulent flow is fluid flow in which the velocity and/or direction of a given particle generally continually changes. Flow that is not turbulent is called laminar flow.

Particularly, the overall volume of air conveyed into the reactor 10 is sufficient in ambient oxygen or other reagents to provide the necessary stoichiometric ratio of reactants for the targeted level and types of reactions, such as combustion, oxidation, oxygenation, speciation change, etc., requiring only the supply of sufficient temperature and/or retention time with residual impurities integral to, deposited on, or comingled with the raw feed fly ash. The overall volume of air is also sufficient to provide the necessary overall average velocity through the reactor to vertically transport substantially all the fly ash through and out of the reactor 10, through a high-temperature cyclonic collector/separator 18, through the heat exchanger 20, which may also serve as an optional combustion air pre-heater, and into a baghouse, or other similar device, for collection.

A portion the air may be conveyed into the reactor 10 through the swirl air nozzles 13 at high velocity, creating a cyclonic swirling reaction zone by which centrifugal forces created by the swirling effect move coarser and/or denser particulate matter to the reaction chamber 10 walls 10A, segregating the particulate matter and providing a solid-to-solid contact zone with the refractory-lined walls 10A in the outside region of the reactor 10, thereby increasing the residence time of the particulate matter in the reaction zone and imparting the longest residence times for the coarsest particles as these particles travel the length of the inside circumference of the reactor 10 many times in a generally upward, helical or spiraling path before exiting the swirling reaction zone of the reactor 10. The angle of the nozzles 14 can be set depending on the particular effect desired (such as, but not limited to, carbon reduction, carbon contact with the refractory walls, or the like).

Also, at least a portion of the air may be conveyed into the reactor 10 through the turbulent air nozzles 14 or manifolds with several heads which can arranged in a single row, multiple rows, staggered or in other configurations, at high velocity, creating a turbulent reaction zone, by which the downward shearing action of high velocity air streams further increases particulate matter residence time in the reaction zone and imparts sufficient kinetic force to disrupt upward and/or laminar swirling air patterns, thereby promoting sufficient mixing of solid and gaseous reactants and/or turbulent scrubbing, which facilitates the mass transfer of reagent molecules, especially ambient oxygen in the high velocity air stream, to effect the desired chemical reaction(s). In one exemplary embodiment the nozzles 14 are arranged in a generally horizontal linear array. The nozzles 14 are preferably angled downward.

The overall air volume may be further divided into a portion for under fire air conveyed into the reactor 10 through a number of "under fire" air ports 15, inhibiting particulate matter fallout, and other portions may be conveyed into the reactor 10 through a number of "over fire" air ports 16, providing sufficient staging and/or total stoichiometric reagent air for the desired effect(s).

As the individual particles of a fine particulate matter, such as fly ash, are exposed to the high temperature within the reactor 10, the particles are heated to elicit the desired chemical and/or physical changes. The processing temperature is preferably above the ignition temperature of any residual unburned carbon; therefore, there will be some reduction in the carbon content of fly ash through combustion. The total amount of carbon reduction will depend on the retention time in the high temperature regime and that retention time will be adjusted, as needed, by altering the velocity of the air flow and/or the amount of recirculation of fly ash, by use of the high-temperature cyclonic collector/separator 18 (or other suitable particle size separation device), and/or introduction of or other fine particulate matter.

In some cases, the processing temperature will be above the fusion temperature of the fly ash mineral matter and/or the fusion temperature of chemical and mineral residuals present in the raw feed fly ash in order to increase the glass-to-crystalline ratio of the mineral matter and/or to reduce the presence of chemical residuals deposited on the fly ash during flue gas treatment at the coal-burning facility. In these cases, the process of the present invention as disclosed in one exemplary embodiment includes a method, preferably through the use of a number of spray water injection nozzles 17 preferably located in the reactor 10 along the top portion, to quickly quench the flue gases and any molten mineral matter while suspended in the flue gas stream in order to increase the quantity and reactivity of the glass and assure that the particulate matter remain in a finely divided state. Preferably, a second set of spray water injection nozzles 17A are located in the conduit 17B between the reactor 10 and the separator 18 (see FIG. 1).

In other cases, the processing temperature will be maintained at or above the required temperatures to effect volatilization, decomposition, and/or the desired change in chemical speciation of chemical residuals deposited on fly ash during the original coal-burning and/or flue gas treatment. Examples of such chemical residuals include, but are not limited to, the residue from hydrated lime, magnesium hydroxide, sodium bicarbonate carbonate, ammonia, sulfur, sodium bisulfate, magnacite, magnesium silicate, magnesium oxide, and residue from other chemicals co-fired and/or co-processed at coal-burning facilities.

In some cases it may be advantageous for the processed particulate matter to be separated from the flue gas stream through the use of the high-temperature cyclonic collector/separator 18 or other suitable separation device at or above certain specified temperatures to allow efficient recirculation of heated particulate matter through the reactor to increase exposure and/or retention time in the reaction zone until the desired physical and/or chemical changes are fully effected; and the high-temperature separation of the processed particulate matter from targeted contaminants that have been volatized and dispersed into the flue gas while still above the condensation temperature of the contaminant(s) so as to reduce the level of that contaminant in the product fly ash.

In other cases it may be advantageous to co-process other substances with coal fly ash by conveying foreign particulate matter, gases, or liquids into the reaction zone through the fine particulate feed ports 12, swirl and turbulent air nozzles 13 and 14 or under-fire/over-fire air ports 15, 16, or, spray water injection nozzles 17 and/or 17A, respectively, which may serve to reduce the liability of and/or add value to the beneficiated product in the commercial marketplace. The unique operating regime of the present disclosure, especially the high temperature and the high velocity air mixing, provides an excellent environment to facilitate chemical and physical processing for many types of particulate matter, including both fly ash and non-ash raw feed materials, as well as expediting the reaction times for many gases and liquids used as reagents to induce certain beneficial effects.

In all cases the fly ash will finally be cooled by being conveyed to and passing through one or more heat exchangers 20 or other cooling device to the lower temperatures expected for use as pozzolan. Depending on the intended effect, the apparatus may be operated so that the fly ash is cooled separately from the flue gases or along with the flue gases as the fly ash and flue gases pass through the heat exchanger 20, a waste heat recovery boiler, and/or other functionally similar devices. After cooling, the material passes to a gas-solids separator, such as a baghouse 22, there solids are collected and gases are removed. Solids are bagged or otherwise packaged for storage or transport.

The present disclosure can effect LOI reduction in seconds rather than minutes; and efficient operation of the present disclosure will attain targeted LOI reduction without the prolonged residence time in a roasting chamber; and thereby, product throughput per unit of time is increased; therefore, the present disclosure does claim carbon reduction through combustion by use of the unique apparatus and process described herein. Consequently, a secondary feature of the present disclosure is to lower the LOI enough to conform to the prescribed maximum LOI limits of controlling specifications for pozzolan-grade fly ash.

Although only a few exemplary embodiments of the present invention have been described in detail above, those skilled in the art will readily appreciate that many modifications are possible in the exemplary embodiments without materially departing from the novel teachings and advantages. Accordingly, all such modifications are intended to be included within the scope of this disclosure as defined in the following claims. It should further be noted that the disclosures of any patents, applications and publications referred to herein are incorporated by reference in their entirety with regard to their parts relevant to the present disclosure.

The invention claimed is:

1. A method for reducing the carbon content of small particulate combustion products said small particulate combustion products consisting essentially of fly ash or fly ash with chemical residue and/or contaminants, said small particulate combustion products being a product of a previous combustion and containing unburned carbon and incombustible matter, the method comprising:

a) introducing a feed of said small particulate combustion products into a swirling and generally upward helical flow within a pneumatic transport solid gas reaction vessel and thereby suspend said small particulate products in a finely-divided, separated state within said flow, said vessel having a top portion, a bottom portion, a side wall between the top portion and the bottom portion, an interior, and an exit, the exit being at the top portion of the vessel, the interior being defined by the top portion, the bottom portion, and the side wall, the interior having an upper section and a lower section and having a substantially uniform cylindrical cross-sectional area between the top portion and the bottom portion, said feed being introduced into an open area in said lower section;
b) at least initially heating the interior of said vessel so as to heat said small particulate combustion products;
c) introducing at least one of air or another gas into said Vessel through said side wall to create said swirling and generally upward helical flow within said vessel, to prevent said small particulate combustion products from forming a particulate bed within said vessel, and to combust at least some of said unburned carbon in said small particulate combustion products to reduce the carbon content and the particle size of the feed of said small particulate combustion products, the introducing of at least one of air or another gas occurring below said introducing of said feed, substantially all of said reduced carbon content and reduced particle size small particulate combustion products exiting said vessel in a flow through the exit at the top portion of the vessel;
d) separating the reduced carbon content and reduced particle size small particulate combustion products from the flow exiting the vessel via the exit at the top of the vessel in a gas-solids separator to provide said reduced carbon content and reduced particle size small particulate combustion products as an output product, said gas-solids separator including a first outlet leading to a processed material collector and a second outlet capable of returning processed material to said vessel;
(e) collecting the output product in a product silo for storage or transport, the collected output product having a reduced carbon content and reduced particle size relative to said feed,
(f) the suspended flow of small particulate combustion products being heated to a temperature within said vessel which is above (i) the fusion temperature of the fly ash mineral matter, (ii) the fusion temperature of chemical and mineral residues present in the raw feed fly ash, or (iii) the ignition temperature of any residual unburned carbon, and
(g) the suspended flow of small particulate combustion products being maintained in the finely-divided, separated state by cooling the suspended flow of small particulate combustion products to a temperature that is less than the ash fusion temperature after step (c) and before step (d).

2. The method of claim 1, wherein the cooling of the suspended flow of small particulate combustion products to a temperature less than the ash fusion temperature includes introducing a liquid near the top portion of the vessel.

3. A method for processing fine particulate matter consisting essentially of fly ash or fly ash with chemical residue and/or contaminants, said fine particulate matter being a product of a previous combustion, containing unburned carbon and incombustible matter, the method comprising:
a) introducing a feed of said fine particulate matter into a swirling and generally helical upward flow in the interior of a pneumatic transport solid gas reactor through a side wall of said reactor and thereby suspend said small particulate products in a finely-divided, separated state within said flow, the reactor having a top portion, a bottom portion, said side wall, an interior, and an exit, said side wall being between the top portion and the bottom portion, the exit being at the top portion of the vessel, the interior being defined by the top portion, the bottom portion, and the side wall, the interior having an upper section and a lower section and having a substantially uniform cylindrical cross-sectional area between the top portion and the bottom portion, said feed being introduced into an open area in said lower section;
b) heating said fine particulate matter to at temperature which is above (i) the fusion temperature of the fly ash mineral matter, (ii) the fusion temperature of chemical and mineral residuals present in the raw feed fly ash, or (iii) the ignition temperature of any residual unburned carbon after said fine particulate matter is inside the reactor;
c) introducing ambient air into said reactor at a high velocity and at a first level through the side wall to create said swirling and generally upward helical flow within said reactor, to prevent said fine particulate matter from forming a particulate bed within said reactor, and to combust at least some of said unburned carbon of said fine particulate matter to reduce the carbon content and the particle size of the feed of said fine particulate matter, the introducing of air at the first level being below the level of the introducing of the feed;
d) introducing ambient air into said reactor through said side wall at a second, different level with at least one of an angle, a velocity, or a volume to at least one of enhance said combusting or enhance said swirling and generally helical upward flow, said second level being above the level of the introducing of said feed;
e) maintaining the suspended flow of small particulate matter in steps (c) and (d) at a temperature which is above (i) the fusion temperature of the fly ash mineral matter, (ii) the fusion temperature of chemical and mineral residues present in the raw feed fly ash, or (iii) the ignition temperature of any residual unburned carbon;
f) maintaining the small particulate matter in the finely-divided, separated state induced by steps a) through d) by introducing a cooling liquid near a top portion of the reactor, above said second level, to cool said particulate matter to a temperature less than the ash fusion temperature prior to said reduced carbon content particulate matter exiting from the reactor through the exit in the top portion of said reactor, substantially all of said reduced carbon content particulate matter exiting said reactor in a flow through said exit; and
g) separating reduced carbon content particulate matter from said flow exiting from said reactor through the exit in the top portion of the reactor using a gas-solids separator to provide reduced carbon content particulate matter as an output product, the output product having a reduced carbon content and reduced particle size relative to said feed, said gas-solids separator including a first outlet leading to a processed material collector and a second outlet capable of returning processed material to said vessel.

4. The method of claim 1 wherein said introducing air or another gas is at a first level within said vessel, and further comprising additionally injecting at least one of air or another gas into said vessel through said side wall at a second, different level, to enhance at least one of said swirling and generally upward helical flow or said combusting of said unburned carbon.

5. The method of claim 4 and further comprising additionally injecting at least one of air or another gas into said vessel through said side wall at a third, different level to enhance said combusting of said unburned carbon, said third level being above said first level and said second level.

6. The method of claim 1 wherein said introducing air or another gas is at a first level within said vessel, and further comprising additionally injecting at least one of air or another gas into said vessel through said side wall at a second, different level with at least one of an angle, a velocity, or a volume to enhance said swirling and generally upward helical flow.

7. The method of claim 1 and further comprising injecting a liquid near the top portion of the vessel to cool said small particulate combustion products prior to said reduced carbon content small particulate combustion products exiting from the vessel.

8. The method of claim 1, further comprising injecting a liquid into said flow after said flow exits from said top portion of said vessel and prior to said separating at least some of the reduced carbon content small particulate combustion products.

9. The method of claim 3 and further comprising injecting a liquid into said flow after said flow exits from said top portion of said reactor and prior to said separating at least some of said reduced carbon content particulate matter from said flow exiting from said reactor.

10. The method of claim 3 and further comprising injecting a liquid into said flow after said flow exits from said top portion of said reactor and prior to said separating at least some of said reduced carbon content particulate matter from said flow exiting from said reactor, and also passing said reduced carbon content particulate matter separated from said flow into a heat exchanger or other cooling device.

11. The method of claim 3 and further comprising introducing at least some of said reduced carbon content particulate matter from said flow back into said reactor to further reduce said carbon content.

12. The method of claim 3 wherein the surface of at least some of said particulate matter has at least one chemical residue thereon, and wherein the temperature of said particulate matter in said reactor is sufficient to remove at least some of said chemical residue.

13. The method of claim 12 and further comprising introducing at least some of said reduced carbon content particulate matter from said flow back into said reactor to further remove at least some of said chemical residue.

\* \* \* \* \*